Jan. 11, 1944.　　　　E. CLARKE　　　　2,339,052
ELECTRIC CIRCUIT
Filed Dec. 26, 1942
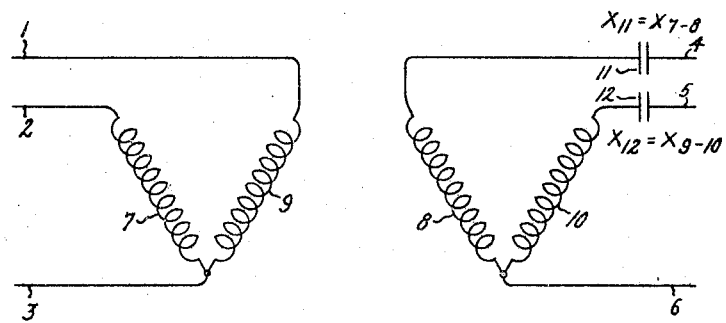
Inventor
Edith Clarke,
by Harry E. Dunham
Her Attorney.

Patented Jan. 11, 1944

2,339,052

UNITED STATES PATENT OFFICE 2,339,052

ELECTRIC CIRCUIT

Edith Clarke, Schenectady, N. Y., assignor to General Electric Company, a corporation of New York Application December 26, 1942, Serial No. 470,249

11 Claims. (Cl. 172—238)

This invention relates to electric circuits and more particularly to improvements in open-delta-connected transformer systems.

The so-called open-delta transformer connection is well known in the art. It differs from a conventional closed-delta connection in that one of the transformers or phases is omitted. On the basis of the same heating it can transmit about fifty-seven per cent of the power that can be transmitted when the delta is closed and it is therefore used in locations where the load is expected to grow. It is also used when one transformer of a closed delta connection fails and it is sometimes supplemented by forced cooling so as to permit overloading in case a forty-three per cent reduction in power transmitted can not be tolerated. Still another use is with autotransformer type voltage regulators, such, for example, as when two single-phase induction voltage regulators are connected open-delta for regulating the voltage of a three-phase circuit.

Recent study of the open-delta connection has revealed that it produces certain undesirable effects. For example, when a three-phase induction motor is fed through such a transformer connection there is more heating in the motor, for the same load, than there is when the delta connection is closed.

I have found that these undesirable effects are eliminated when series impedance of the proper value is connected in the circuit in an unbalanced manner. By "unbalanced" I mean to exclude the connection of equal series impedance in all of the three lines of the system or circuit. For example, I have found that if two series capacitors are connected respectively in the conductors which make connection to the terminals of the open side of the delta and if the effective capacitive reactance of these capacitors equals the leakage reactance of the respective single-phase transformers with which they are serially connected, when referred to the side of the transformer in which the capacitors are connected, the above-mentioned undesirable effects are eliminated and, what is more, the operation is better than if the delta had been closed so far as transformer regulation and motor heating is concerned.

The series capacitors may be connected in either the input or the output side of the transformers, or one may be connected in the input side of one transformer and the other in the output side of the other transformer, or they may be divided into two groups connected respectively in the primary and secondary sides of the transformers. They may be connected directly in the circuit or indirectly therein by means of series transformers. They will have equal reactances only when the leakage reactances of their serially connected transformers are equal. They may either be designed safely to withstand the overvoltages which accompany overloads or short circuits on the system or they may be provided with automatic overvoltage protective equipment of any suitable or well-known type.

A partial explanation of my improved result is that the open-delta connection acts in one way like an unbalanced series inductive impedance and the unbalanced capacitive reactance of the series capacitors combines therewith to remove the unbalance. I realize that it is broadly old to neutralize a series inductance with a series capacitor but it is believed to be new to combine unbalanced series capacitors with unbalanced series inductors so as to produce a resultant balance, and especially is it believed to be unobvious that series capacitors connected in the conductors which make connection with the terminals of the open side of an open-delta-connected transformer can produce such resultant balance.

That the unbalance of the equivalent series impedance of an open-delta-connected transformer will produce objectionable effects, such as harmful motor heating, can be seen from the following. When a balanced load is connected to the circuit the positive sequence load currents which flow through the unbalanced equivalent series impedance produce negative sequence voltages. These negative sequence voltages cause the flow of negative sequence currents which produce objectionable heating and losses. For example, the negative sequence voltage across the terminals of an induction motor will give rise to double frequency currents induced in the motor rotor and these currents cause undesirable losses and heating. Also the negative sequence voltage tends to produce a countertorque in the motor so that the motor must draw a heavier than normal positive sequence current in order to carry its load. This in turn tends to overheat the motor.

As the series capacitors neutralize the effective inductive reactance of the open-delta-connected transformer, the effective impedance of the transformer is only its resistance which is usually relatively low in comparison with its reactance. Therefore, the regulation of the balanced and compensated transformer is very much improved. Consequently, the voltage of a motor which is fed through such a balanced and compensated transformer does not drop as much under load conditions as with an ordinary unbalanced and uncompensated open-delta transformer, or even as much as it would if the delta of such transformer were closed. This is a very substantial improvement in regulation bacuse ordinarily the regulation of an open-delta transformer is much poorer than the regulation when the delta is closed. Consequently, the motor current does not have to increase as much in order to carry the load and this in turn permits the motor to run cooler.

An object of the invention is to provide a new and improved electric circuit.

Another object of the invention is to provide a new and improved open-delta-connected transformer system.

A further object of the invention is to provide an open-delta-connected transformer system whose equivalent series reactance is balanced and neutralized.

Still another object of the invention is to provide a new and improved series capacitor system.

The invention will be better understood from the following description taken in connection with the accompanying drawing and its scope will be pointed out in the appended claims.

Referring now to the single figure of the accompanying drawing which illustrates diagrammatically an embodiment of the invention, there is shown therein a three-phase power system consisting of a first three-phase circuit 1, 2 and 3 and a second three-phase circuit 4, 5 and 6. Interconnecting these circuits is an open-delta-connected transformer system comprising, by way of example, a pair of single-phase insulating transformers, one of which has windings 7 and 8 connected respectively between the conductors 2—3 and 4—6, and the other of which has a pair of windings 9 and 10 connected respectively between the conductors 1—3 and 5—6.

For balancing the unbalanced effective series impedance of this open-delta transformer connection a pair of capacitors or capacitor banks 11 and 12 are connected respectively in series with the conductors 4 and 5, that is to say, they are connected in series with the conductors which are across the open side of the three-phase voltage triangle, two of whose voltages correspond to the voltages of the windings 8 and 10. The effective capacitive reactance of $X_{11}$ of capacitor 11 is made equal to the leakage reactance $X_{7-8}$ between the windings 7 and 8 when referred to the circuit 4—5—6 and the effective reactance $X_{12}$ of capacitor 12 is made equal to the leakage reactance $X_{9-10}$ between the windings 9 and 10 when referred to the circuit 4—5—6.

Ordinarily the leakage reactances or equivalent series reactances of the two transformers which are connected open-delta will be equal so that ordinarily the series capacitors will have equal reactance.

By means of the above-described connection the effective series reactance between the circuits 1—2—3 and 4—5—6 is zero for all three phases so that the combination of the open-delta transformer and the two series capacitors will produce no reactance voltage drop. As the resistance component of the transformer impedance is ordinarily low in comparison with its reactance, the unbalancing of the impedance of the phases of the system by means of this resistance in two of its phases is not ordinarily too serious.

However, I have made the further discovery that the unbalancing effect of anywhere near equal transformer resistance components can be very substantially reduced by suitably altering the values of the two series capacitors and, what is more, this alteration can be made at no substantial cost because it amounts to equal and opposite changes in the reactance of the capacitors. That is to say, the amount of capacitive reactance which is added to one series capacitor is equal to the amount which is subtracted from the other one so that no overall change in series capacitive reactance is needed. If the two transformers have substantially equal effective series resistance, which would usually be the case, then the two series capacitors can be made to balance exactly the equivalent series impedance of the open-delta transformers. The amount by which the reactance of the series capacitors is changed is equal to the sum of the resistance components of the leakage impedances of the two transformers, when referred to the side thereof in which the series capacitors are connected, divided by twice the square root of three. The sign of the change is determined by the phase order or positive phase sequence of the system, it being positive for the leading phase and negative for the lagging phase. For example, if the phase order of the system illustrated in the drawing is 1, 2, 3, or 5, 4, 6, then capacitor 12 is in the leading phase and capacitor 11 is in the lagging phase.

If $R_{7-8}$ and $R_{9-10}$ are the resistance components of the leakage impedances of the transformers 7—8 and 9—10 respectively, when referred to the circuit 4, 5, 6, then if $X_{12}$ is increased by $$-j\left(\frac{R_{7-8}+R_{9-10}}{2\sqrt{3}}\right)$$

and $X_{11}$ is decreased by $$-j\left(\frac{R_{7-8}+R_{9-10}}{2\sqrt{3}}\right)$$

the measure of the overall unbalanced impedance of the system will be equal to $$\sqrt{3}\frac{(R_{9-10}-R_{7-8})}{6}$$

Therefore if $R_{7-8}$ is equal to $R_{9-10}$, no negative phase sequence voltage will be produced by the flow of positive phase sequence current through the system. Both $X_{11}$ and $X_{12}$ are, of course, actually $-jX_{11}$ and $-jX_{12}$ so that the numerical value of $X_{11}$ is decreased and the numerical value of $X_{12}$ is increased a like amount. This can be done by removing unit capacitors (capacitive KVA) from 12 and adding them to 11.

This principle can be applied to unbalanced series impedances of all kinds and is not limited to open delta transformers. For example, suppose the series inductive reactance and resistance are different in all three lines of the power system. Series capacitors in each line which are equal in reactance to the inductive reactance of the respective lines will completely neutralize the system reactance or two capacitors in the two lines having the larger inductive reactance which are equal to the difference between the inductive reactance of their respective lines and the inductive reactance of the remaining line will completely balance the system reactance. If the line with the lowest inductive reactance also has the lowest resistance, then the capacitors can be reproportioned so as to increase the reactance of the one in the leading phase and decrease the reactance of the one in the lagging phase by $$\frac{1}{2\sqrt{3}}$$

times the sum of the differences between the larger resistances and the smallest resistance, or in other words, times the sum of the two larger resistances less twice the smaller resistance.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a three-phase power line for supplying power to a balanced three-phase load, an open-delta transformer system connected in said line, and separate series-impedance means connected in said line for substantially balancing the unbalanced effective series impedance of said transformer system with respect to said balanced three-phase load.

2. In combination, a pair of three-phase circuits, an open-delta transformer system interconnecting said circuits for transmitting power to a balanced three-phase load, and unbalanced series-impedance means connected exclusively in one of said circuits for balancing the unbalanced effective series impedance of said transformer system with respect to said balanced three-phase load.

3. In combination, a pair of three-phase circuits, a pair of single-phase transformers connected in open delta between said circuits, and a pair of series capacitors connected respectively in the two conductors of one of said circuits which are connected to the open side of said open delta, the reactance of each capacitor being substantially equal to the leakage reactance of the transformer to which its conductor is connected when referred to that circuit whereby the combined effective series impedance of said transformers and capacitors is substantially balanced with respect to three phase power flow between said circuits through said transformers and capacitors.

4. In combination, a pair of single-phase transformers and a pair of capacitors, said transformers being connected open delta on their input and output sides so that on each side they have a common terminal and a pair of individual terminals, one of said capacitors being connected in series with an individual terminal of one of said transformers and the other capacitor being connected in series with an individual terminal of the other transformer, each capacitor having a reactance substantially equal to the leakage reactance of its serially-connected transformer.

5. In combination, an $n$-phase line whose conductors contain impedance in such unbalanced proportions that the flow of positive sequence current therethrough produces a negative sequence voltage, and $(n-1)$ reactance elements serially connected respectively in $(n-1)$ of said conductors for substantially eliminating said negative sequence voltage.

6. In combination, an $n$-phase line whose conductors contain impedance in such unbalanced proportions that the flow of positive sequence current therethrough produces a negative sequence voltage, and $(n-1)$ unequal reactance elements of opposite sign to the reactance in said conductors serially connected respectively in $(n-1)$ conductors for substantially eliminating said negative sequence voltage.

7. In combination, a three phase line whose conductors contain resistance and inductive reactance in such unbalanced proportions that the flow of positive sequence current therethrough produces objectionable negative sequence voltage, and means for substantially eliminating said negative sequence voltage comprising a pair of unequal series capacitors connected in two of said conductors.

8. In combination, a three phase line having conductors $a$, $b$, $c$ whose voltages have the same phase order, the reactance and resistance in certain pairs of said conductors being unequal, the resistance $R_a$ in conductor $a$ being less than the resistances $R_b$ and $R_c$ in conductors $b$ and $c$ respectively, series capacitors connected in certain of the conductors of said circuit including conductors $b$ and $c$ for neutralizing and balancing the reactance in said conductors, the reactance of the capacitors in conductor $b$ being $$\left(\frac{R_b+R_c-2R_a}{2\sqrt{3}}\right)$$

greater than that which exactly neutralizes the reactance therein and the reactance of the capacitor in conductor $c$ being $$\left(\frac{R_b+R_c-2R_a}{2\sqrt{3}}\right)$$

less than that which exactly neutralizes the reactance therein.

9. In combination, a three phase line having conductors $a$, $b$, $c$ in that phase order, said conductors having series resistance $R_a$, $R_b$, $R_c$ respectively with $R_a$ being less than $R_b$ or $R_c$, and a pair of series reactance elements connected in conductors $b$ and $c$ respectively, the element in conductor $b$ having a reactance value of $$-j\left(\frac{R_b+R_c-2R_a}{2\sqrt{3}}\right)$$

and the element in conductor $c$ having a reactance value of $$+j\left(\frac{R_b+R_c-2R_a}{2\sqrt{3}}\right)$$

10. In combination, a three phase line, a pair of single phase transformers having substantially equal leakage reactance and resistance connected in open-delta in said line, and a pair of unequal reactance series capacitors connected in two of the conductors of said line which make connection with the terminals of the open side of the delta for substantially exactly balancing the impedance effect of said transformers with respect to said line, whereby the flow of positive sequence current in said line through said transformers and capacitors will produce substantially no negative phase sequence voltage.

11. In combination, a three phase line having phases $a$, $b$, $c$ whose voltages have the same phase order, said phases having series inductance and reactance such that their impedances are $Z_a=R_a+jX_a$, $Z_b=R_b+jX_b$, $Z_c=R_c+jX_c$, respectively, with $R_a$ less than $R_b$ or $R_c$ and $X_a$ less than $X_b$ or $X_c$, and a pair of series capacitors connected in phases $b$ and $c$ respectively, the reactance of the capacitor phase $b$ being equal to $$-j\left[(X_b-X_a)+\left(\frac{R_b+R_c-2R_a}{2\sqrt{3}}\right)\right]$$

and the reactance of the capacitor in phase $c$ being equal to $$-j\left[(X_c-X_a)-\left(\frac{R_b+R_c-2R_a}{2\sqrt{3}}\right)\right]$$

EDITH CLARKE.